United States Patent [19]

Hunter et al.

[11] Patent Number: 5,569,536
[45] Date of Patent: Oct. 29, 1996

[54] MANNICH BASE CURING AGENTS

[75] Inventors: Joe M. Hunter, Houston; Derek S. Kincaid, Katy, both of Tex.

[73] Assignee: Shell Oil Compnay, Houston, Tex.

[21] Appl. No.: 572,199

[22] Filed: Dec. 13, 1995

[51] Int. Cl.$^6$ .......................... C08G 14/06; C08G 59/62; C08L 63/00
[52] U.S. Cl. ................. 428/413; 525/504; 528/99
[58] Field of Search ................ 428/413; 525/504; 528/99

[56] References Cited

U.S. PATENT DOCUMENTS 3,751,471  8/1973  Becker et al. ................ 528/162
4,518,748  5/1985  Haug et al. .
4,552,935  11/1985  Haug et al. .
4,933,392  6/1990  Andrews et al. .

FOREIGN PATENT DOCUMENTS 0066447  12/1982  European Pat. Off. ............ 528/99
48-078254-A  10/1973  Japan .

Primary Examiner—Frederick Krass
Attorney, Agent, or Firm—Dennis V. Carmen

[57] ABSTRACT

A Mannich base curing agent is provided, prepared by reacting butyraldehyde, a phenolic compound and a primary or secondary amine. These curing agents are useful as sole curing agents or as co-curing agents for epoxy resin systems.

14 Claims, No Drawings

MANNICH BASE CURING AGENTS

FIELD OF INVENTION

This invention relates to curing agents. In one aspect, the invention relates to mannich base curing agents for epoxy resin systems.

BACKGROUND OF THE INVENTION

Of the numerous classes of curing agents for epoxy resins, amines and amine derivatives offer the greatest utility for curing of epoxy resins. As a group, these are the only available materials that offer adequate potential for curing, both in thin films and mass, at room temperature. Aromatic amine curatives have been used extensively. However, due to toxicity characteristics, the use of aromatic amines has substantially curtailed. Current amine-based curing agents are primarily either aliphatic or cycloaliphatic in nature such as diethylene triamine, isophorone diamine and 1,2-diaminocyclohexane.

Many commercial curing agent formulations are based on these aliphatic and cycloaliphatic amines which have been modified in some way, either to refine performance aspects, improve combining ratios with epoxy resins or decrease toxicity of the base amine. The most used commercially available amines are fairly small molecules with relatively large amounts of nitrogen. Low molecular weight members are sufficiently volatile that hazardous concentrations can accumulate within confined air spaces.

As organic bases, amines react readily with atmospheric moisture and carbon dioxide to form the corresponding amine carbonate. This serves to "block" or inhibit reaction of amine with epoxide. This phenomenon is most readily evident in curing of thin films. Applied coatings of epoxy resin blended with unmodified amine will remain largely uncured unless baked. Also, amine carbonate is insoluble in the matrix, and will remain on the surface of the coating as a hazy film, referred to as "bloom," "blush" or "sweat-out."

Amines are typically combined with epoxy resins such that a ratio of one amine hydrogen unit per epoxide group is employed. The lower molecular weight ethyleneamines have the capability to form tightly cross linked networks when used as epoxy curing agents. However, at ambient temperature, curing rate slows as polymer viscosity increases, so that curing is incomplete unless accelerators are used or temperature is increased to compensate. In order to be useful for ambient temperature curing purposes, low molecular weight, highly functional amines must be modified in some way to minimize carbonation and improve curing performance and reduce volatility.

Mannich Bases are examples of amine modification which minimizes carbonation. Mannich Base compounds are products based on the reaction of an aldehyde, generally formaldehyde, a phenolic compound and an amine. Commercially available Mannich Bases are based on formaldehyde, either utilized as an aqueous solution of the gas, or in polymerized form as paraformaldehyde.

High levels of aldehyde are beneficial in providing a Mannich Base having in combination with liquid epoxy resins (1) rapid cure, both at ambient and reduced temperature, (2) good mechanical strength and hardness properties, and (3) generally good chemical resistance characteristics. However, such high levels tend to advance product viscosity beyond a useable range. Low viscosity is desirable for most applications involving this class of curing agent.

SUMMARY OF THE INVENTION

According to the invention, an epoxy resin composition is provided comprising:

(a) an epoxy resin having at least 1.5 epoxy groups per molecule, and (b) a Mannich Base prepared by reacting (i) butyraldehyde (ii) a phenolic compound and (iii) a primary or a secondary polyamine. The composition is useful for adhesives applications, for flooring applications, for encapsulation applications, and for coatings applications.

DETAILED DESCRIPTION OF THE INVENTION

Accordingly, it is desirable to obtain a Mannich Base curing agent having low viscosity, generally less than about 5000 cP at 25° C., preferably less than 1000 cP at 25° C., for use with epoxy resins. It has been found that the epoxy resin system of the invention containing a Mannich Base prepared by reacting (i) butyraldehyde (ii) a phenolic compound and (iii) a primary or a secondary polyamine has good performance characteristics and low viscosity.

The Mannich Base can be prepared by reacting butyraldehyde, a phenolic compound and a primary or a secondary polyamine. Typically, the mole ratio of polyamine to phenolic compound is within the range of about 1:1 to about 10:1, more preferably from about 2:1 to about 4:1. Typically, the mole ratio of the polyamine to butyraldehyde is within the range of about 1:1 to about 10:1, preferably from about 2:1 to about 4:1. On an equivalents basis, the ratio of butyraldehyde to polyamine should be less than or equal to one mole of butyraldehyde per equivalent of amine nitrogen. Similarly, the ratio of butyraldehyde to phenolic compound should be less than or equal to one mole of butyraldehyde per equivalent of phenolic compound.

Typically, the polyamine and the phenolic compound are placed in a suitable vessel, and mixed thoroughly. Butyraldehyde is then added, either continuously over a period of time, or incremental. Reaction is spontaneous and fairly exothermic. Provisions for temperature control are necessary. After completion of aldehyde addition, water that is formed as a by-product is removed by distillation. Chemical reaction during synthesis is believed to involve electrophilic addition of aldehyde to phenolic compound to form an alkanolated phenol intermediate. Further condensation with amine and elimination of water yields the Mannich reaction product. These products are used either as sole curing agents or as co-curing agents for epoxy resin systems.

The phenolic compound can be any compound which contains at least one hydroxyl group attached to at least one aromatic ring. The aromatic ring(s) may have one or more substituents such as alkyl groups, as long as at least one carbon atom located at the 1, 4 or 6 positions relative to the hydroxyl bearing carbon atom is unsubstituted. Preferably the phenolic compound can be represented by the formula:

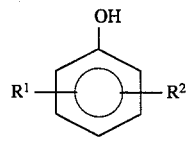

wherein $R^1$ and $R^2$ are independently hydrogens or hydrocarbyl groups having from 1 to 12 carbon atoms. $R^1$ and $R^2$ can be linear, branched or aromatic. Examples of suitable phenolic compounds include phenol, nonylphenol, butylphenol, ortho, meta and para cresols, hydroquinone, paraphenylphenol and dodecylphenol. Te polyamine can be any primary or secondary polyamine. Preferably the polyamine can be represented by the formula

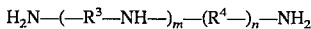

wherein $R^3$ and $R^4$ are divalent hydrocarbyl groups, preferably having 2 to 20 carbon atoms, and m and n are integers ranging from 0 to 5, with the condition that m and n may not both be simultaneously 0 (m+n is at least 1). The hydrocarbyl groups may be branched or linear alkylene groups, cycloaliphatic groups or contain aromatic groups as long as the attached amines are primary or secondary aliphatic amines. Examples of the polyamines include 2-methylpentane diamine, triethylene tetramine, isophorone diamine, metaxylylene diamine and 1,2-diaminocyclohexane.

The Mannich Base curing agent is present in an amount effective to cure the epoxy resin. The weight ratio of the epoxy resin to Mannich Base curing agent is typically from about 1:1 to about 5:1, preferably from about 2:1 to about 3:1.

Accelerators are generally not required, but can be utilized, if desired to increase the cure rate of the epoxy resin-curing agent system. Various amine-compatible accelerators can be used as long as they are soluble in the Mannich Base curing agent. Examples of useful accelerators include 2,4,6-Tris(dimethylaminomethyl)phenol, N,N-Diethylethanolamine, N,N-Dimethylbenzylamine and the like. Typical concentrations of such accelerators, if present, may be from about 0.1% to about 10% of the Mannich Base curing agent, preferably from about 1% to about 5%.

The epoxy resin can be any epoxy resin which can be cured by the Mannich Base curing agent. Generally, the epoxy resin can be any curable epoxy resin having a 1,2-epoxy equivalency greater than one and preferably, on the average, more than about 1.5 epoxide groups per molecule. The epoxy resin can be saturated or unsaturated, linear or branched, aliphatic, cycloaliphatic, aromatic or heterocyclic, and may bear substituents which do not materially interfere with the curing reaction. Such substituents can include bromine. The epoxy resin may be monomeric or polymeric, liquid or solid, but is preferably liquid at room temperature. Suitable epoxy resins include glycidyl ethers prepared by reacting epichlorohydrin with a compound containing at least one, preferably two or more, hydroxyl groups carried out under alkaline reaction conditions. Examples of epoxy resins suitable for use in the invention include polyglycidyl ethers of polyhydric phenols, epoxy novolacs or similar glycidated polyphenolic resins, polyglycidyl ethers of alcohols, glycols or polyglycols, and polyglycidyl esters of polycarboxylic acids.

The preferred epoxy resin is a resin based on a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy- 1-naphthyl)methane; 1,5-dihydroxynaphthalene; 1,1-bis(4-hydroxy- 3-alkylphenyl) ethane and the like. Suitable polyhydric phenols can also be obtained from the reaction of phenol with aldehydes such as formaldehyde (bisphenol-F). Fusion products of these polyglycidyl ethers of polyhydric phenols with phenolic compounds such as bisphenol-A are also suitable as epoxy resins, such as those described in U.S. Pat. Nos. 3,477,990 and 4,734, 468. Commercial examples of preferred epoxy resins include, for example, EPON® Resins 862, 828, 826, 825 and 1001 available from Shell Chemical Company.

These preferred epoxy resins may also optionally be blended with a glycidyl ether of an aliphatic or aromatic alcohol, glycol or polyglycol, or a glycidyl ester of a monocarboxylic acid. Examples include butyl glycidyl ether, phenyl glycidyl ether, cresyl glycidyl ether, 1,4-butanediol diglycidyl ether, the glycidyl ester of neodecanoic acid, and the like. These glycidyl ethers and esters may be blended with the preferred epoxy resin in concentrations of from about 1% to about 50% in order to affect properties such as wetting characteristics, viscosity, flexibility, adhesion characteristics, and so forth. EPON® Resins 815, 813 and 8132 (available from Shell Chemical Company) are examples of preferred epoxy resins containing such modifiers.

The preferred epoxy resin systems of the invention may contain one or more epoxy resins and a curing agent containing the Mannich Base. The epoxy resin can be blended or mixed with the curing agent containing the Mannich Base simultaneously or in any order at a temperature below the curing temperature which is typically below about 100° C.

When used as co-curing agent, the butyraldehyde-based Mannich curing agent can be used with another curing agent for epoxy resins. Such curing agents include the reaction products formed through reaction of an excess of a polyamine with a monocarboxylic or polycarboxylic acid, epoxy resin, a monoglycidyl ether of an aliphatic or aromatic alcohol, or the glycidyl ester of a monocarboxylic or polycarboxylic acid. Such modified amines are well known in the art.

The curable epoxy resin composition can be cured at a temperature within the range of from about −40° C., preferably from about −10° C., to about 150° C., for a time effective to cure the epoxy resin. For standard ambient cure applications the composition is preferably cured at ambient temperature from about 15° C. to about 40° C.

Further to facilitate handling or application or use in various environments, the curing agent or the epoxy resin system can be diluted with minor amounts of aliphatic or aromatic hydrocarbons, alcohols or glycol ethers.

The epoxy resin composition of the invention may include other additives, such as flow control additives, antifoam agents, or anti-sag agents, as well as other additives such as pigments, reinforcing agents, fillers, elastomers, stabilizers, extenders, plasticizers, or flame retardants depending on the application.

The epoxy resin composition is useful for adhesives, coatings, flooring, casting and encapsulants.

The curable epoxy resin composition can be applied by brush, roller, spray, squeege or other means, or poured or injected into a suitable mold and allowed to cure.

For adhesives, the curable epoxy resin composition will typically be applied to a substrate either neat or in a solvent, at ambient or elevated temperature. Solvent, if any, will be allowed to evaporate and the substrates will be pressed together, followed by cure of the adhesive at ambient or elevated temperatures.

For flooring applications, the curable epoxy resin composition can optionally be combined with sand, glass beads, ground talc or alumina, metallic powders, fillers, pigments and the like, and applied to a substrate by brushing, troweling squeegeing or other suitable means.

For coatings applications, the curable epoxy resin composition can contain various solvents, fillers, flow control agents, pigments and colorants or plasticizers. Application to a substrate can be by brushing, spraying, rolling, squeegeing, or any other suitable means.

For casting and encapsulation, the curable epoxy resin composition can likewise contain various fillers, pigments, plasticizers and so forth. Application can be by pouring, injection or other means of introduction onto an article or into a suitable mold.

These curable epoxy resin compositions when cured form articles such as adhesives, coatings, binders, casting and encapsulants.

ILLUSTRATIVE EMBODIMENT

The following illustrative embodiments describe the process of the invention and are provided for illustrative purposes and are not meant as limiting the invention.

Examples 1, 2, 5, 6, 9, 11 and 12 demonstrate the low viscosity of the Mannich Base curing agent prepared from butyraldehyde, a phenolic compound and a diamine compared with Mannich Base curing agents prepared using other aldehydes in Examples 3, 4, 7, 8, and 10. Example 13 demonstrate the epoxy resin system of the invention using the butyraldehyde based Mannich Base curing agent.

Butyraldehyde of 99% purity was obtained from Aldrich. Para-formaldehyde and 37% aqueous formaldehyde were obtained from Janssen.

Metaxylylene diamine was obtained from Mitsubishi Gas Chemical. Isophorone diamine was obtained from Huls America, Inc. 2-Methylpentamethylene diamine (Dytek A) and diaminocyclohexane, 99%, were obtained from DuPont Chemicals. Triethylene tetramine was obtained from Dow Chemical Company.

Phenol was obtained from Mallinckrodt. Para-tertiary-butylphenol was obtained from Schenectady. Nonylphenol was obtained from General Electric.

EPON® Resin 828 (a diglycidyl ether of bisphenol A having epoxy equivalent weight of 185-192) was obtained from Shell Chemical Company.

It has been found that use of butyraldehyde, rather than formaldehyde or paraformaldehyde, results in products exhibiting unexpectedly low viscosity, even though the molecular weight of butyraldehyde is higher than that of formaldehyde. Generally, increasing molecular weight correlates to higher viscosity. Data points in Tables 1 and 2 provide comparative information that illustrates this effect.

EXAMPLE 1

To a 1-liter 3-neck flask equipped with a stirrer, thermocouple, condenser, distillation receiver and addition funnel were added 272 grams (2 moles) of metaxylylene diamine ("MXDA") and 94 grams (1 mole) of phenol. The flask contents were purged with nitrogen and heated to 48° Centigrade. 144 grams (2 moles) of butyraldehyde were added dropwise to the mixture over 60 minutes while maintaining 47°-50° C. After an additional 60 minutes at 47°-54° C., the temperature was raised to 160° C. All distillate was collected during this temperature increase. After holding 20 minutes at 160° C., temperature was raised to 170° C. After 45 minutes, flask contents were cooled and discharged. Yield was 465.8 grams of a pale amber liquid having a percent titratable nitrogen of 11.8%, weight per gallon of 8.65 pounds per gallon and a Brookfield viscosity at 25° C. of 181 cP.

EXAMPLE 2

Example 1 was repeated, except that 150 grams (1 mole) of paratertiary-butylphenol were substituted for 94 grams of phenol. 523.7 grams of product were obtained having a percent titratable nitrogen of 10.44%, weight per gallon of 8.42 and a viscosity of 194 cP at 25° C.

EXAMPLE 3

To a 2-liter 3-neck flask equipped with a stirrer, thermocouple, condenser and distillation receiver were added 188 grams (2 moles) of phenol, 544 grams (4 moles) of metaxylylene diamine and 30 grams of deionized water. The flask contents were purged with nitrogen and heated to 45° C. 134 grams of 90%-92% concentration paraformaldehyde were added at the rate of 33.5 grams every 30 minutes while maintaining temperature at 47°-52° C. After an additional 60 minutes, flask contents were heated to 100° C. over 40 minutes. After 10 minutes at 100° C., undissolved paraformaldehyde was present. An additional 30 grams of deionized water were added. After an additional 60 minutes, undissolved material was still present. The flask contents were raised to 160° C. while collecting all distillate. After 230 minutes, undissolved material was present. The flask contents were cooled and stoppered overnight. The next day, flask contents were purged with nitrogen and the temperature raised to 165° C. over 30 minutes and held 515 minutes at 163°-165° C. Flask contents were cooled and discharged. Resultant product was a thick liquid having a percent titratable nitrogen of 14.09%, weight per gallon of 9.48 pounds per gallon and a Brookfield viscosity of 278,000 cP at 25° C.

EXAMPLE 4

To a 2-liter 3-neck flask equipped with a stirrer, thermocouple, condenser and distillation receiver were added 228 grams (1 mole) of 96.5 % paranonylphenol and 272 grams (2 moles) of metaxylylene diamine. Flask contents were purged with nitrogen and raised to 65° C. over 20 minutes. 162.2 grams (2 moles) of 37% aqueous formaldehyde and 137.8 grams of deionized water were pre-mixed and placed in an addition funnel. This solution was added to the flask contents dropwise over 115 minutes while maintaining 64°-65° C. Flask contents were then mixed an additional 60 minutes at 65° C. Temperature was raised to 100° C., at which point boiling ensued. Boiling was maintained for 60 minutes. Then, by removing all distillate, flask contents were increased to a temperature of 160° C. and held at this temperature of 60 minutes. Flask contents were cooled and discharged. The resultant product was a thick liquid having a percent titratable nitrogen of 10.43%, weight per gallon of 8.67 pounds per gallon, and a Brookfield viscosity of 178,000 cP at 25° C.

EXAMPLE 5

Example 1 was repeated, except that 228 grams (1 mole) of 96.5% paranonylphenol were substituted for 94 grams of phenol. 602.6 grams of a product having a percent titratable nitrogen of 9.10%, weight per gallon of 8.26 pounds per gallon and a Brookfield viscosity of 304 cP were obtained.

EXAMPLE 6

To a 3-liter 3-neck flask equipped with a stirrer, thermocouple, condenser and distillation receiver were added 300 grams (2 mols) of para-tertiarybutylphenol and 342 grams (3 moles) of diaminocyclohexane ("DACH"). The flask contents were purged with nitrogen and raised to 49° C.–51° C. minutes. 216 grams (3 moles) of butyraldehyde were added dropwise to the mixture over a 120 minute period while maintaining 49°–51° C. After an additional 80 minutes, the temperature was raised to 170° C. All distillate was collected during this temperature increase. After 30 minutes at 170° C., the flask contents were cooled and discharged. Yield was 795 grams of an amber liquid having a Brookfield viscosity of 354 cP at 25° C., weight per gallon of 8.05 and a percent titratable nitrogen of 10.33%.

EXAMPLE 7

To a 3-liter, 3 neck flask equipped with a stirrer, thermocouple, condenser and distillation receiver was added 342 grams (3 moles) of diaminocyclohexane and 300 grams (2 moles) of para tertiary butylphenol. The flask contents were purged with nitrogen and raised to 50° C. 243 grams (3 moles) of 37 percent aqueous formaldehyde were added dropwise. The temperature was raised with distillation to 170° C. After holding 60 minutes at 170° C., the flask contents were cooled and discharged. Yield was 784.6 grams of an amber liquid having a Brookfield viscosity greater than 1,000,000 centipoise at 25° C., and a percent titratable nitrogen of 11.61 %.

EXAMPLE 8

Using the procedure outline in Example 4, a formulation composed of 340.6 grams, (2 moles) of isophorone diamine ("IPDA"), 150 grams (1 mole) of para tertiary butylphenol, 81.1 grams, (1 mole) of 37% aqueous formaldehyde and 68.9 grams deionized water was prepared. The resulting product was a thick liquid having a titratable nitrogen content of 10.81%, weight per gallon of 8.13 and a viscosity of 15,700 centipoise at 25° C.

EXAMPLE 9

Example 8 was repeated except that no deionized water was used, and 72 grams (one mole) of butyraldehyde were substituted for 81.1 grams of 37% aqueous formaldehyde. Resulting product was an amber liquid having a percent titratable nitrogen of 9.97%, weight per gallon of 7.85 pounds per gallon and a viscosity of 262 centipoise at 25° C.

EXAMPLE 10

To a 3-liter 3-neck flask equipped with a stirrer, thermocouple, condenser and distillation receiver were added 584 grams (4 mole) of triethylene tetramine ("TETA") and 514 grams (3.45 moles) of para tertiary butyl phenol. The flask contents were purged with nitrogen and raised to 65° C. over 20 minutes. 243.2 grams (3 moles) of 37% aqueous formaldehyde were added dropwise to the mixture over a 60 minute period while maintaining 65° C. After an additional 60 minutes the temperature was raised to 160° C. All distillate was collected during this temperature increase. After 45 minutes at 65° C. the flask contents were cooled and discharged. Yield was 1181.5 grams of a slightly amber liquid having a Brookfield viscosity of 6200 cP at 25° C., weight per gallon of 8.50 and a percent titratable nitrogen of 18.18.

EXAMPLE 11

To a 1-liter 3 neck flask equipped with a stirrer, thermocouple, condenser and distillation receiver were added 174 grams, (3 moles) of DyteK A, a commercial preparation of 2-methylpentamethylene diamine ("MPMDA") and 150 grams, (2 moles) of para-tertiary-butylphenol. Flask content were purged with nitrogen and raised to 73° C. After solution occurred, 108 grams, (3 moles) of butyraldehyde were added dropwise over 60 minutes while maintaining 73° C. After an additional 60 minute period at 73° C., flask contents were raised to 163° C. with distillation. After 15 minutes at 170° C., flask contents were cooled and discharged. Yield was 408.5 grams of an amber liquid having a Brookfield viscosity of 69 centipoise at 25° C., a weight per gallon of 7.69 pounds per gallon and a percent titratable nitrogen of 10.07 percent.

EXAMPLE 12

To a 1-liter 3-neck flask equipped with a stirrer, thermocouple, condenser, distillation receiver and addition funnel were added 136 grams (1 mole) of metaxylylene diamine and 220 grams of para-nonylphenol. Flask contents were purged with nitrogen and mixed. During mixing, temperature increased to 34° Centigrade. 72 grams (1 moles) of butyraldehyde were added dropwise to the mixture over 50 minutes as temperature was allowed to rise to 49° C. After an additional 10 minutes at 47°–49° C., the temperature was raised to 100° C. All distillate was collected during this temperature increase. After holding 120 minutes at 100° C., vacuum was applied to distill out volatiles. A sample was withdrawn and tested for viscosity at 40° C. A value of 175 centipoise was obtained. Japanese Patent Publication Number 48-78254 cites a comparable formulation based on formaldehyde as having a viscosity at 40° C. of 4700 centipoise.

EXAMPLE 13

Products resulting from Example 1 and Example 2 were tested for characteristics when used as curing agents for EPON® 828. Compositions from Example 1 and Example 2 were mixed with EPON 828 at ratios of 42.1 parts and 47.1 parts, respectively, per 100 parts of EPON 828. Resulting mixtures were poured into glass molds and cured 16 hours at 75° F., followed by baking 2 hours in an oven at 200° F. Resulting ⅛ inch thick sheets were removed from the glass molds, machined to provide proper test specimens, and evaluated for tensile properties and chemical resistance characteristics. Obtained values listed in Table 1 indicate products resulting from the invention are useful as curing agents.

TABLE 1

|  | Example 1 | Example 2 | Example 3 |
|---|---|---|---|
| Amine Type | MXDA | MXDA | MXDA |
| Aldehyde Type | B[1] | B[1] | P[1] |
| Phenol Type | Phenol | Butylphenol | Phenol |
| Mole ratio: amine/aldehyde/phenol | 2/2/1 | 2/2/1 | 2/2/1 |
| PHYSICAL CONSTANTS |  |  |  |
| Viscosity, cP | 181 | 194 | 278,000 |
| Weight per Gallon, lbs/gal. | 8.65 | 8.42 | 9.48 |
| % Titratable Nitrogen | 11.8 | 10.44 | 14.09 |
| Combination Ratio with EPON ® Resin 828 (phr)[2] | 42.1 | 47.1 |  |
| Performance Properties |  |  |  |
| Tensile Strength, psi | 12270 | 12530 |  |
| Tensile Modulus (× 10[6]) | 0.52 | 0.53 |  |
| Percent Elongation | 7.7 | 5.2 |  |
| % Weight Gain in:[3] |  |  |  |
| Deionized Water | 0.11 | 0.11 |  |
| 5% Acetic Acid | 0.11 | 0.11 |  |
| 50/50 Xylene/IPA | 0.05 | 0.58 |  |

[1] B = Butyraldehyde; P = Paraformaldehyde
[2] ⅛ inch sheet castings cured 16 hours at 75° F. plus 2 hours at 200° F.
[3] 24 hour immersion

TABLE 2

|  | Example 4 | Example 5 | Example 6 | Example 7 |
|---|---|---|---|---|
| Amine Type | MXDA | MXDA | DACH | DACH |
| Aldehyde Type | F[1] | B[1] | B[1] | F[3] |
| Phenol Type | Nonylphenol | Nonylphenol | Butylphenol | Butylphenol |
| Mole ratio: amino/aldehyde/phenol | 2/2/1 | 2/2/1 | 3/2/2 | 3/2/2 |
| PHYSICAL CONSTANTS |  |  |  |  |
| Viscosity, cP | 178,000 | 304 | 354 | >1000000 |
| Weight per Gallon, lbs/gal. | 8.67 | 8.26 | 8.05 | — |
| % Titratable Nitrogen | 10.43 | 9.10 | 10.33 | 11.61 |

|  | Example 8 | Example 9 | Example 10 | Example 11 | Example 12 |
|---|---|---|---|---|---|
| Amine Type | IPDA | IPDA | TETA | MPMDA | MXDA |
| Aldehyde Type | F[1] | B[1] | F[1] | B[3] | B[1] |
| Phenol Type | Butylphenol | Butylphenol | Butylphenol | Butylphenol | Nonylphenol |
| Mole ratio: amine/aldehyde/phenol | 2/2/1 | 2/2/1 | 4/3/3.45 | 3/3/2 | 1/1/0.965 |
| PHYSICAL CONSTANTS |  |  |  |  |  |
| Viscosity, cP | 15,700 | 262 | 6200 | 69 | 175[2] |
| Weight per Gallon, lbs/gal. | 8.13 | 7.85 | 8.26 | 7.69 | 8.17 |
| % Titratable Nitrogen | 10.81 | 9.97 | 16.58 | 10.07 | 6.86 |

[1] F = 37% Aqueous Formaldehyde; B = Butyraldehyde; P = Paraformaldehyde
[2] Tested at 40° C.

We claim:

1. A curable composition comprising:
   (a) an epoxy resin having at least 1.5 epoxy groups per molecule, and
   (b) a Mannich base prepared by reacting (i) butyraldehyde (ii) a phenolic compound and (iii) a primary or a secondary polyamine, wherein the Mannich base has a viscosity of less than 1000 cP at 25° C.

2. The composition of claim 1 wherein the phenolic compound can be represented by the formula:

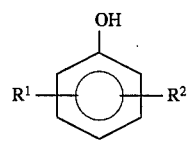

wherein $R^1$ and $R^2$ are hydrogens or hydrocarbyl groups having from 1 to 12 carbon atoms.

3. The composition of claim 2 wherein the polyamine can be represented by the formula

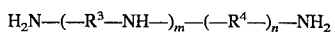

wherein $R^3$ and $R^4$ are divalent hydrocarbyl groups having 2 to 20 carbon atoms, and m and n are integers ranging from 0 to 5, provided that m +n is at least 1.

4. The composition of claim 3 wherein the polyamine is selected from the group consisting of 2-methylpentane diamine, triethylene tetramine, isophorone diamine, metaxylylene diamine and 1,2-diaminocyclohexane.

5. The composition of claim 2 wherein the epoxy resin is a polyglycidyl ether of a polyhydric phenol.

6. The composition of claim 1 wherein the mole ratio of the epoxy resin to Mannich base is from about 1:1 to about 5:1.

7. The composition of claim 1 further comprising (c) a curing agent for epoxy resin other than component (b).

8. A cured composition of claim 1.

9. A cured composition of claim 3.

10. A substrate coated with the curable epoxy resin composition of claim 1.

11. An article of manufacture comprising a shaped article having a surface and an adhesive composition comprising the composition of claim 1 applied on at least a portion of said surface.

12. An epoxy resin composition comprising composition of claim 1 and at least one composition selected from the group consisting of sand, glass beads, ground talc, ground alumina, metallic powders, fillers, and pigments.

13. A cured composition of claim 12.

14. The composition of claim 6, wherein the mole ratio of the epoxy resin to Mannich base is from about 2:1 to about 3:1.

* * * * *